United States Patent

[11] 3,582,851

| [72] | Inventor | Robert H. Meservey |
| | | Lexington, Mass. |
| [21] | Appl. No. | 17,446 |
| [22] | Filed | Mar. 9, 1970 |
| [45] | Patented | June 1, 1971 |
| [73] | Assignee | Massachusetts Institute of Technology |
| | | Cambridge, Mass. |
| | | Continuation-in-part of application Ser. No. 690,145, Dec. 6, 1967, now Patent No. 03,504,283. |

[54] APPARATUS ADAPTED TO PROVIDE A ZERO MAGNETIC FIELD ENVIRONMENT
14 Claims, 11 Drawing Figs.

[52] U.S. Cl. ................................................. 336/73, 335/216, 336/225, 336/DIG. 1
[51] Int. Cl. ................................................. H01f 27/28
[50] Field of Search ....................................... 336/73, 255 DIG. 1; 335/216

[56] References Cited
UNITED STATES PATENTS
3,214,679 10/1965 Richards ..................... 336/DIG. 1
FOREIGN PATENTS
1,402,426 5/1965 France ........................ 335/216

*Primary Examiner*—Thomas J. Kozma
*Attorneys*—Thomas Cooch, Martin M. Santa and Robert Shaw ABSTRACT: Apparatus is disclosed for providing a substantially zero magnetic field environment. The apparatus consists of a plurality of closed-loop superconductors, each forming one side of a boxlike enclosure. The sides are flexibly joined to allow them to be rendered superconductive while all are disposed in one plane or in parallel planes or moved accordion fashion to configurations which present minimum areas through the central openings of the loops and thereafter to be repositioned to form a boxlike structure, the inner portion of which is entirely surrounded by the superconductive sides which prevents entry of flux lines into said inner portion.

PATENTED JUN 1 1971

3,582,851

INVENTOR
ROBERT H. MESERVEY
BY
ATTORNEY

INVENTOR:
ROBERT H. MESERVEY
BY Robert Shaw
ATTORNEY

PATENTED JUN 1 1971
3,582,851
SHEET 5 OF 5
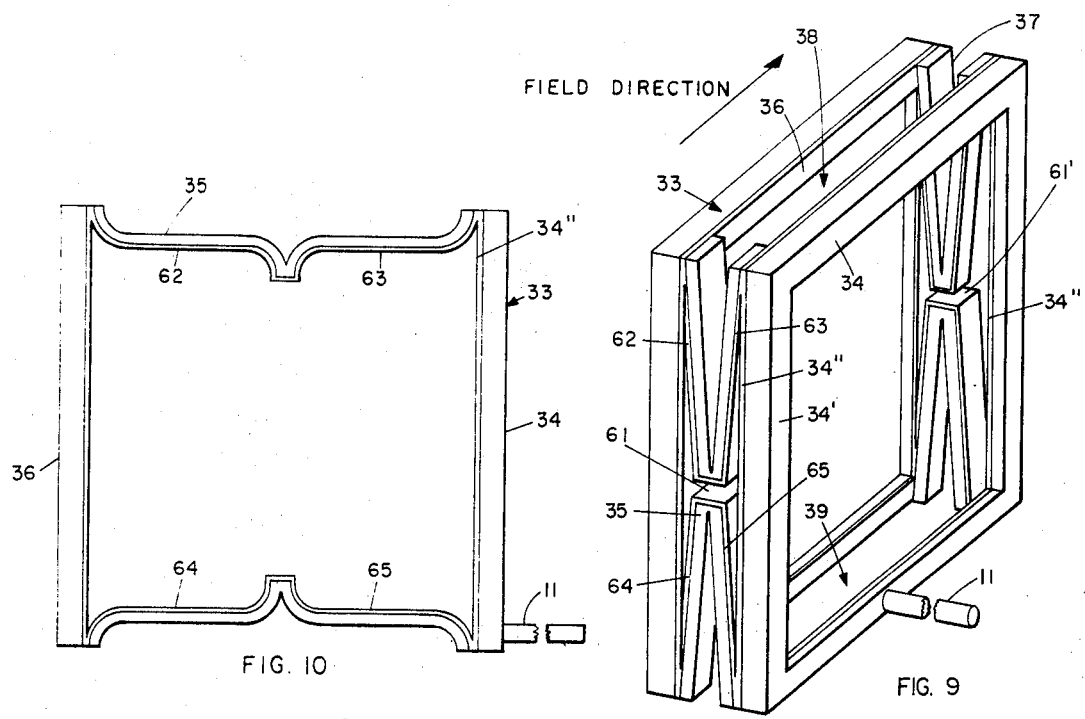
FIG. 10
FIG. 9
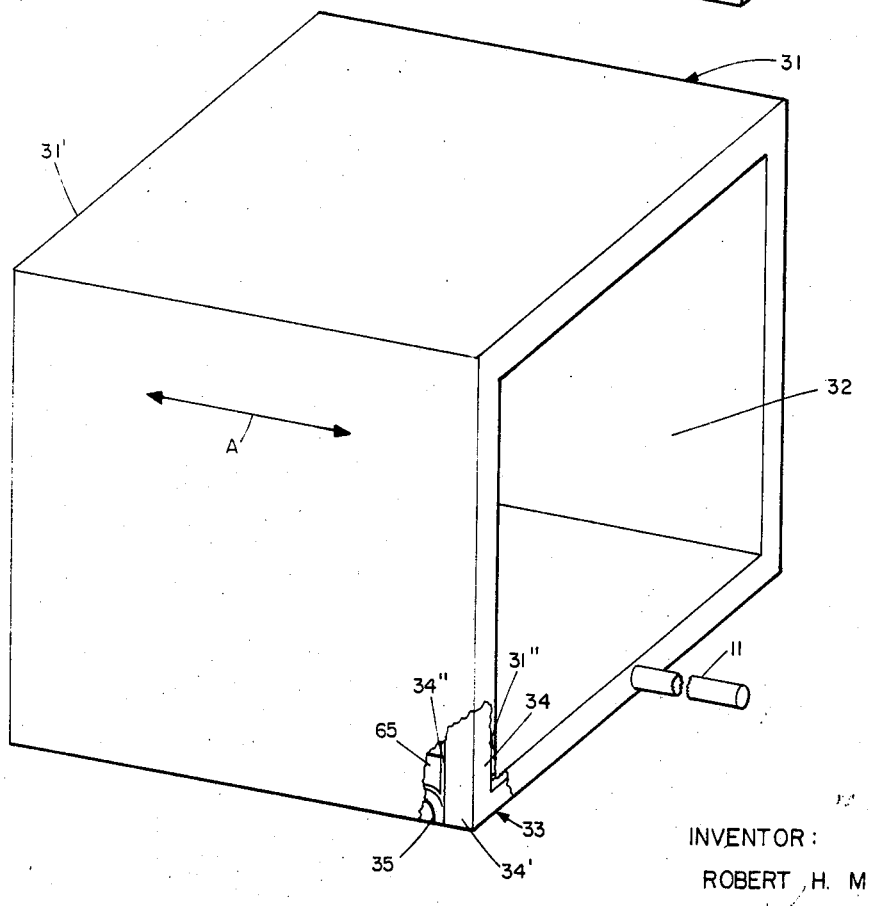
FIG. 11
INVENTOR:
ROBERT H. MESERVEY
BY
ATTORNEY

3,582,851

APPARATUS ADAPTED TO PROVIDE A ZERO MAGNETIC FIELD ENVIRONMENT

This is a continuation-in-part of application Ser. NO. 690,145 now U.S. Pat. No. 3,504,283 filed on Dec. 6, 1967, in the name of the present inventor.

The work herein described was made in the course of work performed under a contract with the Air Force Office of Scientific Research.

The present invention relates to apparatus adapted to provide zero magnetic field conditions.

There exists a need particularly in laboratories for environments free from DC and low frequency AC magnetic fields (typically lower than microwave frequencies). Such field-free environments have been made by providing rooms made of high permeability materials, but these are quite expensive to construct and their effectiveness for the desired results is in question. Also, high permeability metal construction is not very effective for laboratory tabletop installations for which adaptations of the present invention are particularly well suited.

Accordingly, an object of the invention is to provide apparatus capable of affording zero DC and low frequency AC magnetic field environments and to provide in such apparatus the capability of furnishing such environments in room-sized volumes and in smaller sizes for laboratory tabletop uses, as well.

Further objects are evident in the following specification and are particularly pointed out in the appended claims.

The objects of the invention are attained in apparatus adapted to provide a region of low ambient magnetic field, that includes, a plurality of closed-loop superconductors which form a boxlike structure around said region; the sides of the structure are flexibly connected to allow the superconductors to be rendered superconductive while presenting minimum area of central opening of the individual closed-loops in a direction to receive any ambient magnetic field through said central opening and to be moved subsequent to being rendered superconductive to form said boxlike structure. This is effected by orienting the plane of the closed loops parallel to any ambient magnetic field to minimize magnetic flux through the central opening of the closed loops during the time that superconductivity is effected or by thusly orienting some of the closed loops and collapsing others thereof.

The invention will be explained upon reference to the accompanying drawing in which:

FIG. 9 is a modification of the embodiment of FIG. 1 and illustrates a superconductor configuration which can be closed, accordion fashion, as shown in FIG. 9, to present a minimum of central opening to the ambient magnetic field during the time that the superconductor loops are rendered superconductive;

FIG. 10 is the same embodiment as shown in FIG. 9 except that the loops are opened to provide a boxlike structure; and FIG. 11 is an isometric view, partially cut away, showing a dewar to receive the collapsible-coil arrangement of FIGS. 9 and 10 to provide cooling for rendering the loops superconductive.

Figure 3:
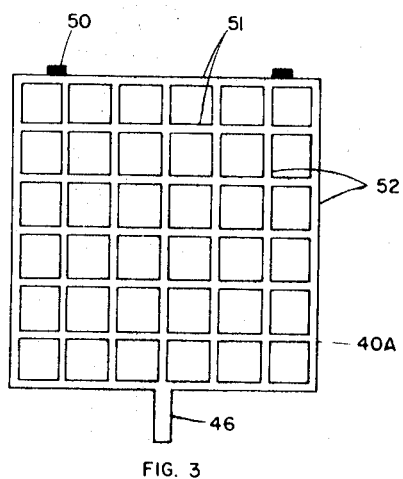
FIG. 3 illustrates a modification of the sides of the apparatus of FIGS. 1 and 2.

A superconductor coil which is subjected to an axial magnetic field during the time that it is rendered superconductive attempts to retain the flux level within the area enclosed by the coil. Thus, if rendered superconductive in a zero magnetic field, the coil opposes entry of any flux directed generally axially through the central opening but has no effect on flux directed along the plane of the coil. The boxlike construction of FIG. 1 comprising tubular sides 40, 41, 42, 43, 44 and 45 provides an inner space which can be made to have a substantially zero magnetic field environment if the respective closed loops associated with the sides 40—45, as hereinafter discussed, are made superconductive in a zero magnetic field environment. Since it is practically impossible to provide a large volume substantially zero field condition without a prohibitively costly structure, the best that can be hoped, ordinarily, is that a unidirectional field condition can be found. Thus, the box structure of FIG. 1 may be opened to the planar configuration of FIG. 2, the plane of the sides being directed parallel to the ambient magnetic field during the time that superconductivity is being achieved, the tubular sides 40—45 being hingedly secured together to enable the box to be opened out, as shown. A plurality of hinges 50 serve that purpose. The sides 40—45 are made up of a superconductor material surrounded by a fairly thin coaxial cylindrical shell to carry liquid helium to effect superconductivity, as more particularly discussed in later paragraphs. It is necessary that the liquid pass from side to side; so the hinges 50 preferably each include a flexible tubing to enable passage of the liquid which can be introduced at pipes 46 and 49 and expelled at 47 and 48. Since some axial penetration of field into the coil area exists, the screenlike structure labeled 40A of FIG. 3, comprising a plurality of lateral and longitudinal tubes 51 and 52, respectively, (each containing closed-loop superconductors) is proposed. The closed loop configuration of FIG. 1 with or without the screenlike modification provides an economical but effective structure that can be installed at a workbench or other area to provide a low magnetic field environment for the herein described use, or others, to exclude DC magnetic fields, or even moderate-frequency AC fields having wavelengths that are long compared to the screen openings.

Figure 1:
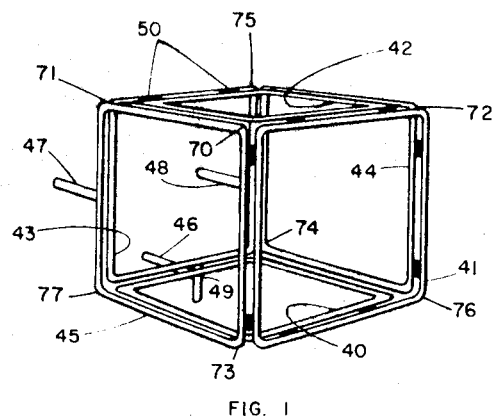
FIG. 1 shows a plurality of cryogenic cooling tubes containing closed-loop superconductors, each forming a side of a boxlike structure.
Figure 2:
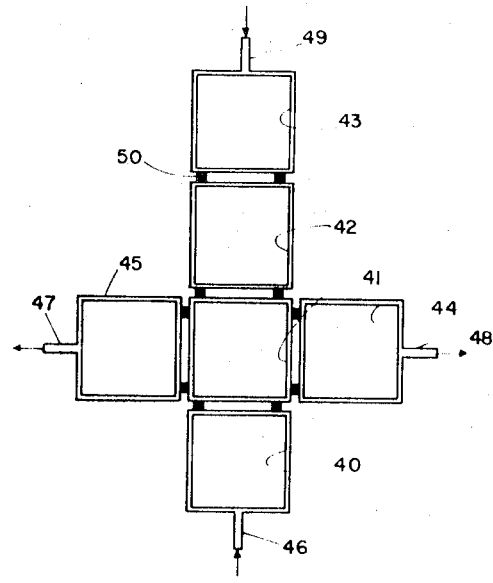
FIG. 2 shows the apparatus of FIG. 1 opened from the boxlike structure into a single plane to allow orientation thereof in a direction parallel to any ambient magnetic field during the time that the loops are rendered superconductive.
Figure 4:
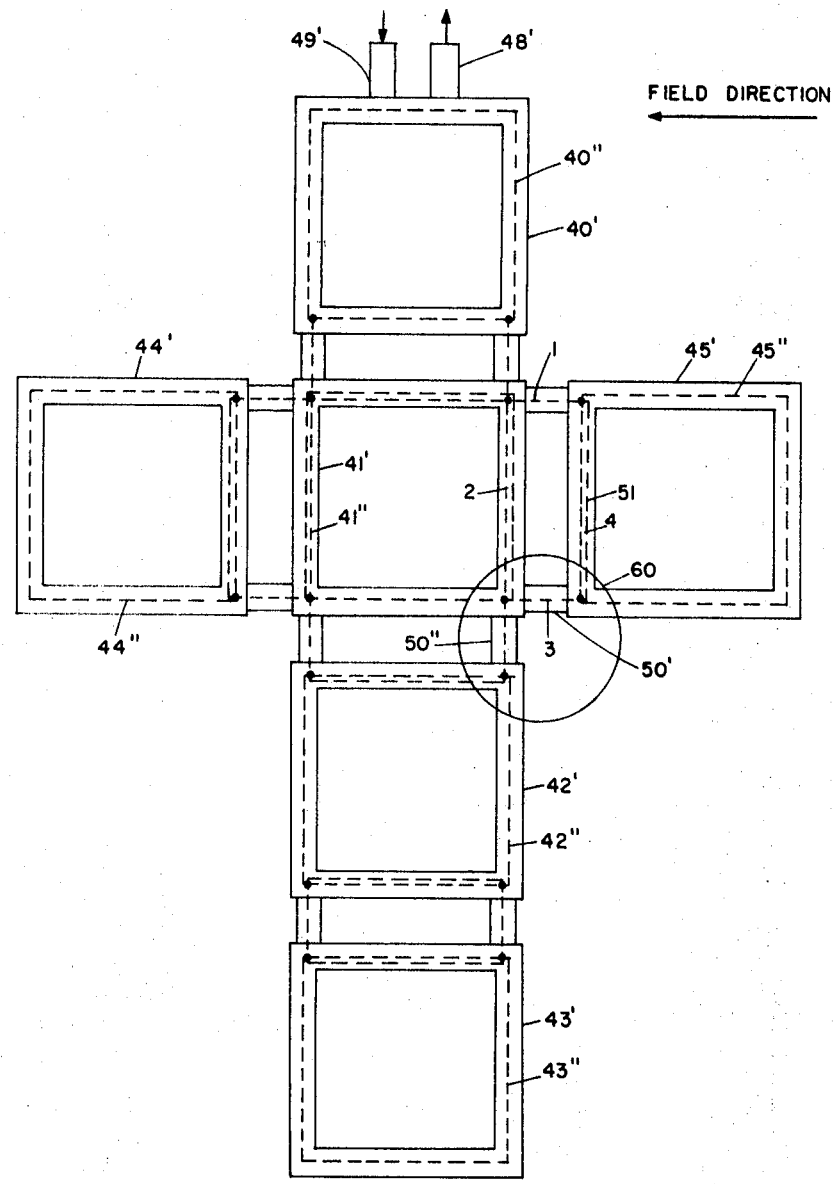
FIG. 4 is similar to FIG. 2 but shows more details than are shown in FIG. 2.

In the apparatus of FIG. 4, tubular sides are assigned the same number designations as is used in FIGS. 1 and 2 except the numbers are primed in FIG. 4; also, closed-loop superconductors are shown dotted in FIG. 4 and labeled 40''—45'' to correspond respectively to the sides 40'—45'. In addition, there are shown auxiliary loops at the edge of several sides, the auxiliary loops being adapted to prevent entry of magnetic flux lines at such edges; one such auxiliary loop, labeled 51, is made up of conductors 1, 2, 3, and 4 which form a closed loop at the joint or juncture between the sides 40' and 41'. The conductors 1 and 3 pass through the hinges connecting the loops 41' and 45'. The hinges (as for example the hinge 50') are placed as close to the corner as possible to minimize leakage of flux into the closed box configuration at the corners. In the apparatus of FIG. 4 the coolant is introduced at 49' and removed at 48' after having passed serially through the loops 40', 41', etc. The superconductor loops in FIG. 4 are each shown as closed individual loops. In fact, because of the need to convey the liquid helium in the tube containing the superconductor, as particularly shown in FIG. 8, the individual conductors in some instances pass through the hinges and the loop is completed by a superconductor jumper connection as hereinafter explained in connection with FIG. 8.

Figure 5:
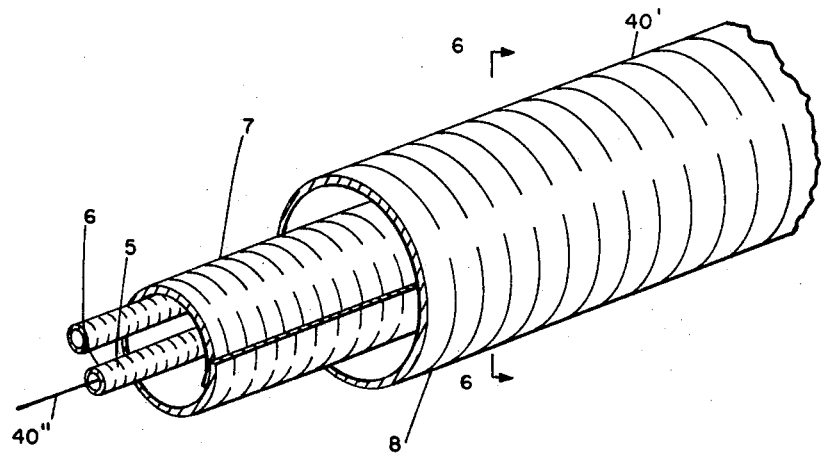
FIG. 5 is a cutaway section view, on an enlarged scale, showing a portion of one of the tubes shown in FIG. 1.
Figure 6:
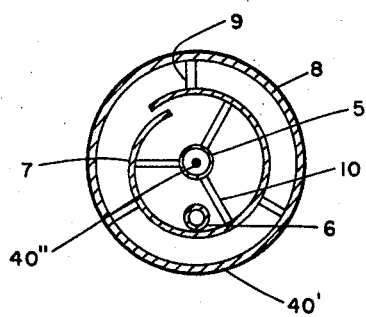
FIG. 6 is a view taken upon the line 6—6 in FIG. 5 looking in the direction of the arrows.

In FIG. 5 the portion of the tube shown is taken to be a part of the side 40', although it could represent any of the other sides of FIGS. 1, 2, 3, and 4. The composite element shown comprises the superconductor 40'' which is disposed within a liquid helium environment within a tube 5 at about 4°K; an adjacent stainless steel tube 6 passes liquid nitrogen and the two tubes are surrounded by a copper radiation shield 7; and all are enclosed by an outside stainless steel tube 8. The various elements within the outside tube are positioned by spacers 9 and 10, as shown in FIG. 6.

Figures 7, 8:
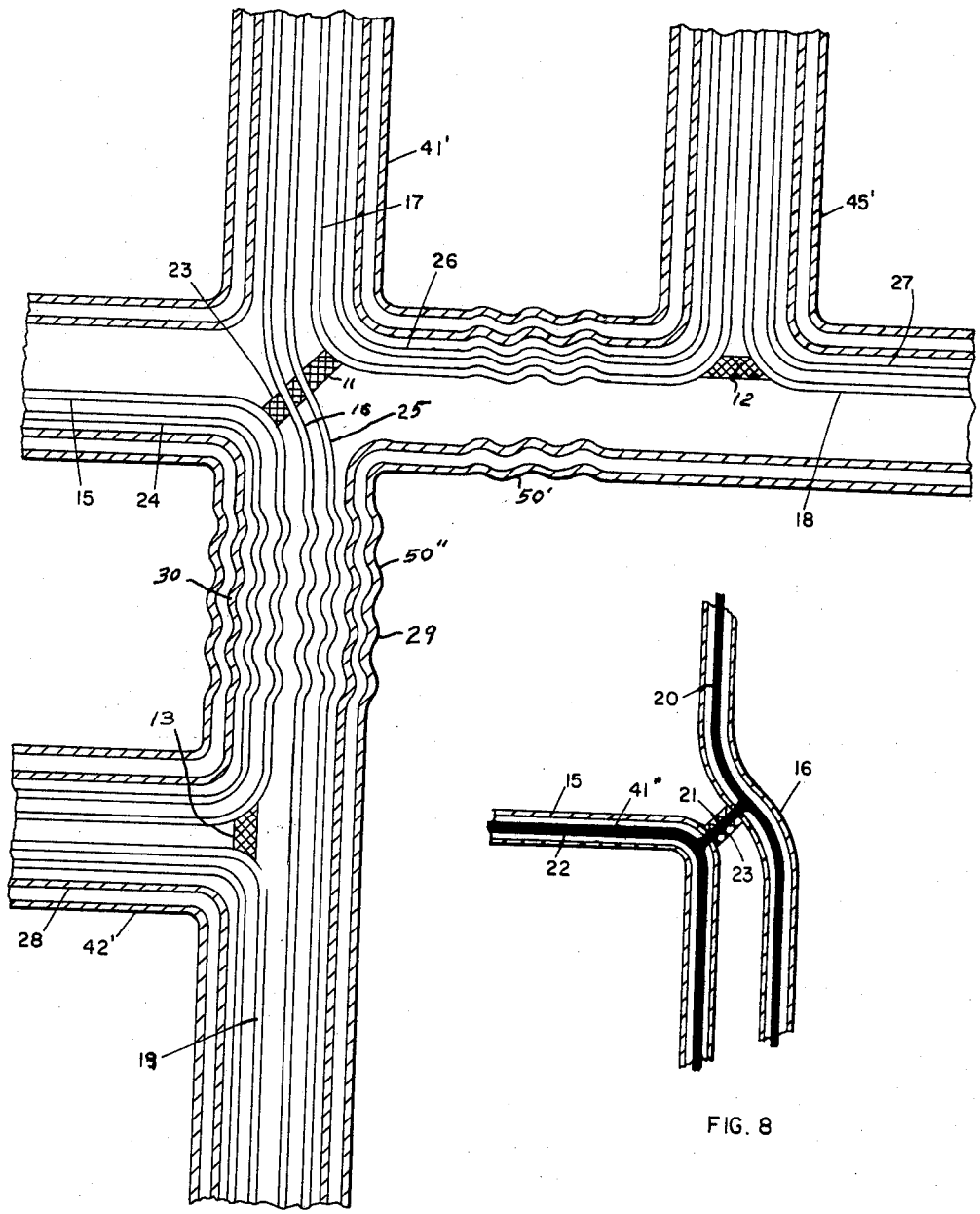
FIG. 7 is an enlarged section view of the part of FIG. 4 within the circle labeled 60.
FIG. 8 is a view of a part of the apparatus shown in FIG. 7.

The elements shown in FIG. 7 are those included within the circle shown at 60 in FIG. 4 and include the hinge 50' and a further hinge 50''. As shown, the wires and tubes making up and passing through the hinges are made in the form of a bellows. Such flexible tubing can be of the type made by Janis Research K.; Inc. of Stoneham, Mass., and advertised by that company. Liquid helium is carried by the tubes marked 15, 16, 17, 18, and 19, and, as shown in FIG. 8, the superconductor 41'' in the vicinity of the hinges is made up of conductors 20 and 22 which are bridged by a conductor 21 connected therebetween and held by a copper 31 block 23 also acts to keep the conductor 21 at liquid helium temperature. Similarly functioning copper blocks 11, 12 and 13 serve to cool bridging conductors between the superconductors within tubes 16 and 17, 17 and 18, and 15 and 19, respectively. Liquid nitrogen is carried by the tubes marked 24, 25, 26, 27 and 28. A radiation shield is also shown but only the shield numbered 30 in the hinge 50'' is labeled. The external shell of the hinge 50'' has been labeled 29. The arrangement discussed in this paragraph provides a minimum of magnetic field leakage into the boxlike structure and yet allows fabrication of the structure with presently available or fabricated parts.

In the embodiment shown in FIGS. 9 and 10, the boxlike superconductor loop structure shown at 33, is in a form which allows it to collapse, in accordion fashion, from 111 open condition shown in FIG. 10 to the closed condition shown in FIG. 9. The structure 33 first within a dewar 31 in FIG. 11. Superconductivity is effected by introducing liquid helium into the inner chambers designated 31'' of the dewar 31 thereby immersing the loops to make them superconductive. The central through opening 32 of the dewar serves as the zero magnetic field environment work region. In FIGS. 9 and 10 the boxlike structure 33 is shown comprising six closed-loop sides 34, 35, 36, 37, 38 and 39. The loops 34 and 36 are of rigid construction and are positioned within the dewar 31 in such a way that the side 36 is secured at the left side, marked 31' and the side 34 is free to move to the left or right in the dewar of FIG. 11, in the direction of the arrow labeled A, in response to a force upon an expansion control 11, thereby to open and close the superconducting box structure 33. The control 11 is merely a low heat conducting rod attached to the box 33 and extending out from the dewar 31 through a sliding vacuum seal. The flexible elements making up the loop 35 (and also the loop 37) can be made of a relatively heavy beryllium copper support with a thin (0.001 to 0.002 inch) superconducting coating of lead or niobium, as shown at 62, 63, 64 and 65, for example. Also, the loops 34 and 36 can be made of some material as stainless steel with a similar superconducting coating. Thus, the loop 34 is shown comprising a stainless steel structure 34' and a superconductor coating 34'' and the side 36 is similarly constructed. The loops 38 and 39 which are the bottom and top sides, respectively, of the open box, are made up of conductors common to the sides 34, 35, 36 and 37, as can be noted, but in the open condition of FIG. 10 there is the equivalent of six closed-loop sides in the structure 33. The box 33 in FIG. 9 is shown just slightly open but it can be completely collapsed to present small openings 61 and 61', only, to any ambient magnetic field. The flexible sides 35 and 37 are each shown comprising four articulated leg members, but could include any even number of such leg members. At the time the structure 33 is being rendered superconductive, the sides 34 and 36 are oriented parallel to any ambient magnetic field, as before discussed. The dewar 31 can be a double wall device with either an outside liquid nitrogen container or superinsulation. The structure 33 can be inserted into the dewar 31 and the dewar 31 can be thereafter sealed by bolts and O-rings or by welding.

Thus, there is disclosed superconductor apparatus adapted to form a boxlike structure but which can be arranged in another configuration when being rendered superconductive. In the structure shown in FIGS. 1, 2, and 4 the box sides are hinged together to allow them to be opened up into a single plane and in the embodiment of FIGS. 9 and 10 two of the sides are of rigid construction and are joined by four flexible or articulated superconductor legs which allow the rigid sides to move toward and away from each other, the rigid sides being disposed in parallel planes during the time that they are being rendered superconductive and the flexible legs being collapsed or folded in accordion fashion to minimize the area through the central opening of the sides formed thereby. Since the superconductors forming the legs are so very thin, as discussed previously, the resultant openings 61, and 61' in FIG. 9, oriented in the magnetic field direction, can be made quite small.

One further modification is worthy of mention. In the embodiment of FIGS. 1 and 2, it is possible to omit the sides numbered 40 and 42, for example, and provide flexible coupling between the remaining sides at the corners numbered 70—77 of the box of FIG. 1. The flexible coupling would be similar to that shown in FIG. 7 and would pass liquid helium and nitrogen as well as superconductor interconnections similar to 1 and 3 in FIG. 4. Such flexible coupling would allow the boxlike structure of FIG. 1 to be collapsed, as by moving the corners 70 and 73 toward 75 and 74, respectively, during the time the superconductors were rendered superconductive, and the collapsed sides could then be oriented parallel to any ambient field, as previously discussed.

Other modifications of the invention herein disclosed will occur to persons skilled in the art.

What I claim is:

1. Apparatus adapted to provide a low magnetic field environment, that comprises a plurality of sides each embodying a closed-loop superconductor, means for rendering the closed-loop superconductive, the sides being flexibly connected to allow disposal thereof parallel to the ambient magnetic field during the time the sides are made superconductive and to form a boxlike structure subsequent to reaching the superconductive state.

2. Apparatus as claimed in claim 1 in which the sides comprise a plurality of closed-loops adapted to become superconductive at a reduced temperature, the loops being hingedly secured together to enable parallel disposition thereof during the time that the closed loops are rendered superconductive, and to fold out to form a unitary boxlike structure subsequent to reaching the superconductive state.

3. Apparatus as claimed in claim 2 and in which unitary means is provided to introduce a liquid coolant to the coils to effect superconductivity.

4. Apparatus adapted to provide a low ambient magnetic field, that comprises, a plurality of closed-loop superconductors each forming a side of a boxlike structure, the sides being flexibly connected to allow the superconductors to be rendered superconductive while presenting the minimum area of central opening of the individual closed-loops in a direction to receive any ambient magnetic field through said central opening and to be moved subsequent to being rendered superconductive to form said boxlike structure.

5. Apparatus as claimed in claim 4 that comprises a plurality of closed loop sides hingedly secured together to allow parallel disposition thereof during the time that the loops are rendered superconductive and to fold to form a unitary boxlike structure subsequent to reaching the superconductive state.

6. Apparatus as claimed in claim 5 which includes further closed loops superconductors disposed at the junction of some of the superconductor sides and adapted to prevent entrance of any ambient magnetic fields at said juncture.

7. Apparatus as claimed in claim 4 in which the structure comprises two rigid sides adapted to move toward and away from one another and four legs connecting said rigid sides to form four edges of the box, the legs being adapted to collapse in accordion fashion when the rigid sides are moved toward each other.

8. Apparatus as claimed in claim 7 and including a dewar receiving the boxlike structure and to allow movement of the rigid sides toward and away from each other.

9. Apparatus as claimed in claim 8 in which the superconductors are a thin superconductive coating on a heavier support material.

10. A Helmholtz coils configuration comprising, in combination, a plurality of closed loops adapted to become superconductive at a reduced temperature, the loops being hingedly secured together to allow parallel disposition thereof during the time that the loops are rendered superconductive and to fold out to form a unitary boxlike structure subsequent to reaching the superconductive state.

11. A Helmholtz coils configuration as claimed in claim 10 and in which the configuration comprises six substantially planar loops.

12. A Helmholtz coils configuration as claimed in claim 11 and in which each of the loops comprises a plurality of lateral and longitudinal conductors electrically interconnected to form a screenlike structure.

13. A method of providing a low magnetic field work area that comprises, surrounding the area by a plurality of closed-loop superconductors formed into a boxlike structure, repositioning the superconductors to allow orientation of at least some of the closed loops parallel to any ambient magnetic field to allow minimum magnetic flux through the central openings thereof, rendering the closed loop superconductive during the time that a minimum flux is passing through said central opening, and thereafter reforming said boxlike structure about the work area.

14. A method as claimed in claim 13 in which some of closed loops are positioned parallel to the ambient field and the remaining sides are collapsed to reduce the central opening during that time that superconductivity of the closed loops is effected.